United States Patent
Agrawal et al.

(10) Patent No.: US 12,297,017 B2
(45) Date of Patent: May 13, 2025

(54) UNIVERSAL STORAGE SECURITY IMPLEMENT FOR CANNABIS CONTAINERS

(71) Applicant: Paper Tube LLC, Long Grove, IL (US)

(72) Inventors: Parag Agrawal, Buffalo Grove, IL (US); Vadim David Molo, Wheeling, IL (US)

(*) Notice: Subject to any disclaimer, the term of this patent is extended or adjusted under 35 U.S.C. 154(b) by 771 days.

(21) Appl. No.: 16/565,685

(22) Filed: Sep. 10, 2019

(65) Prior Publication Data
US 2021/0070512 A1    Mar. 11, 2021

(51) Int. Cl.
| | |
|---|---|
| B65D 50/04 | (2006.01) |
| B65D 43/02 | (2006.01) |
| F16B 7/18 | (2006.01) |
| F16L 15/04 | (2006.01) |
| F16L 15/06 | (2006.01) |
| F16L 25/14 | (2006.01) |

(52) U.S. Cl.
CPC ......... *B65D 50/04* (2013.01); *B65D 43/0225* (2013.01); *F16B 7/18* (2013.01); *F16L 15/04* (2013.01); *F16L 15/06* (2013.01); *F16L 25/14* (2013.01); *B65D 2215/02* (2013.01)

(58) Field of Classification Search
CPC .... B65D 50/061; B65D 50/041; B65D 50/04; B65D 43/022; B65D 1/0246; F16B 7/18
See application file for complete search history.

(56) References Cited

U.S. PATENT DOCUMENTS

| | | | | |
|---|---|---|---|---|
| 2,076,549 A | * | 4/1937 | Conner | A45D 40/0068 215/382 |
| 2,076,551 A | * | 4/1937 | Conner | A45D 40/0068 215/44 |
| 2,315,538 A | * | 4/1943 | Moeller | B65D 39/12 138/89 |
| 2,859,085 A | * | 11/1958 | Morrison | A45D 40/0068 215/12.1 |
| 2,867,361 A | * | 1/1959 | Toft | B65D 47/122 222/574 |
| 3,549,049 A | * | 12/1970 | Alwin | B67B 7/26 222/91 |
| 3,703,974 A | * | 11/1972 | Boxer | B65D 50/061 215/217 |
| 3,817,416 A | * | 6/1974 | Costa | B65D 55/089 222/153.07 |
| 3,871,543 A | * | 3/1975 | Chadfield | A45D 40/0068 215/12.1 |
| 4,058,232 A | * | 11/1977 | Ohno | B65D 50/063 215/217 |

(Continued)

*Primary Examiner* — Daniel J Wiley

(57) ABSTRACT

A universal security implement for cannabis containers includes a security mechanism interface, a rim, and an immobilization implement. A user of the universal security implement for cannabis containers can fully secure a container by situating the universal security implement onto or into the container such that the immobilization implement fully precludes movement relative to the container. Moreover, the universal security implement's user may manipulate a security mechanism, such as a child-resistant cap, such that the security mechanism and the security mechanism interface interact to fully close and secure the contents within the container.

19 Claims, 5 Drawing Sheets

(56) References Cited

U.S. PATENT DOCUMENTS

| | | | | |
|---|---|---|---|---|
| 4,258,854 | A * | 3/1981 | Wright | B65D 49/04 |
| | | | | 215/21 |
| 4,446,673 | A * | 5/1984 | Desthieux | B67B 7/02 |
| | | | | 53/319 |
| 4,527,705 | A * | 7/1985 | Prades | B65D 41/3447 |
| | | | | 215/341 |
| 5,474,209 | A * | 12/1995 | Vallet Mas | B65D 51/285 |
| | | | | 215/DIG. 8 |
| 5,687,866 | A * | 11/1997 | Luch | B65D 41/0421 |
| | | | | 215/354 |
| 6,742,678 | B1 * | 6/2004 | Krystopik, Jr. | B65D 47/122 |
| | | | | 222/481.5 |
| 8,298,174 | B2 * | 10/2012 | Showers | A61J 7/0061 |
| | | | | 215/386 |
| 8,448,822 | B2 * | 5/2013 | Rousselet | A45D 40/0068 |
| | | | | 222/256 |
| RE45,611 | E * | 7/2015 | Haley | B65D 47/06 |
| 2004/0256346 | A1 * | 12/2004 | Becker | B65D 1/0246 |
| | | | | 215/44 |
| 2013/0186918 | A1 * | 7/2013 | Menceles | B65D 41/0407 |
| | | | | 222/567 |
| 2018/0244446 | A1 * | 8/2018 | Gaillot | B65D 55/0863 |
| 2019/0069699 | A1 * | 3/2019 | Nichols | A47G 19/2288 |

\* cited by examiner

UNIVERSAL STORAGE SECURITY IMPLEMENT FOR CANNABIS CONTAINERS

This is a nonprovisional application for patent under 35 U.S.C. § 111 (a).

TECHNICAL FIELD

The instant disclosure relates to security mechanisms for cannabis containers.

BACKGROUND

Though current cannabis containers recognize the need for secure containment, they currently fall short of solutions for multiple applications of secure containment across different types of both cannabis containers and security mechanisms. Moreover, these currently available cannabis containers only utilize secure containment mechanisms that are nontransferable across different types, thus disallowing the container's user the ability to leverage a single security mechanism across multiple cannabis containers.

BRIEF DESCRIPTION OF THE DRAWINGS

One or more preferred exemplary embodiments will hereinafter be described in conjunction with the appended drawings, where like designations denote like elements, and wherein.

DETAILED DESCRIPTION

The universal security implement of the instant disclosure solves the aforementioned problems an inability to utilize multiple storage containers with a single corresponding security mechanism, and the inability to transfer a security mechanism from one storage container of a given type to another—in at least two ways: first, by having a means by which the device can interface with multiple security mechanisms; and second, by acting as a transferrable platform across containers via immobilization within different storage containers belonging to a given type, thereby implementing a way by which to secure the contents while simultaneously leveraging a preexisting means of secure containment.

Figure 1:
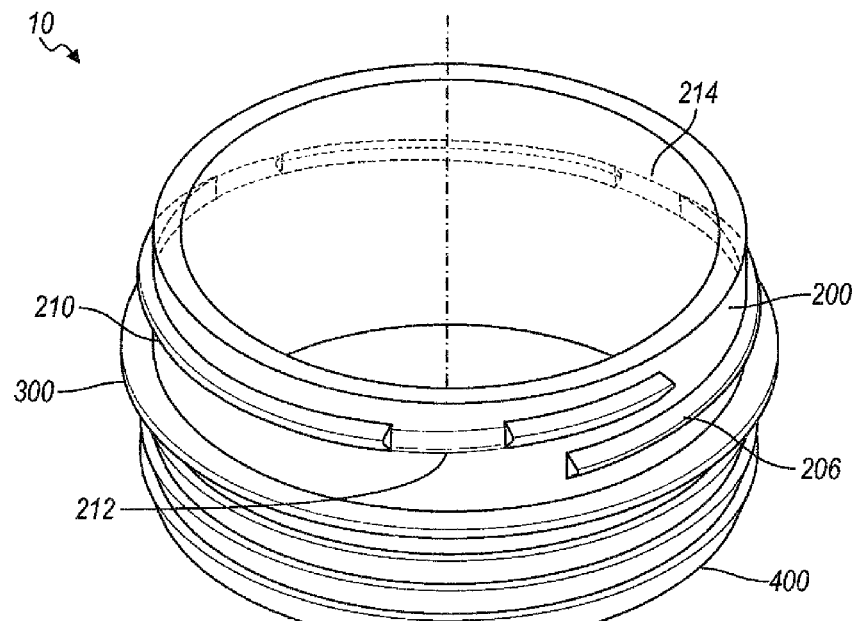
FIG. 1 is a top side perspective view of an exemplary embodiment of the universal security implement present disclosure.
Figure 2:
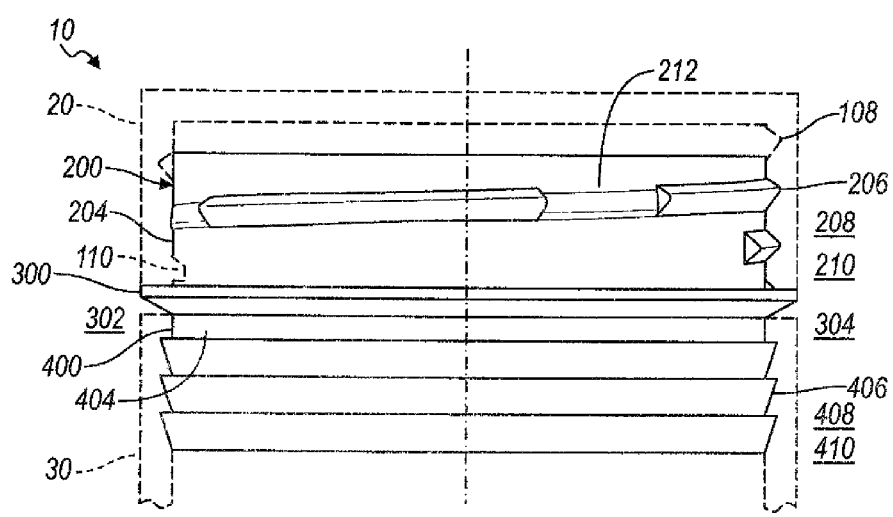
FIG. 2 is a side profile view of the universal security implement.

Referring to the drawings, and in particular FIG. 1, an exemplary embodiment of a universal security implement 10, designed to be used with a security mechanism such as a child-resistant security caps, is shown. Referring to FIG. 2, a security mechanism 20 and a container 30 are shown with respect to the universal security implement 10.

Figure 7:
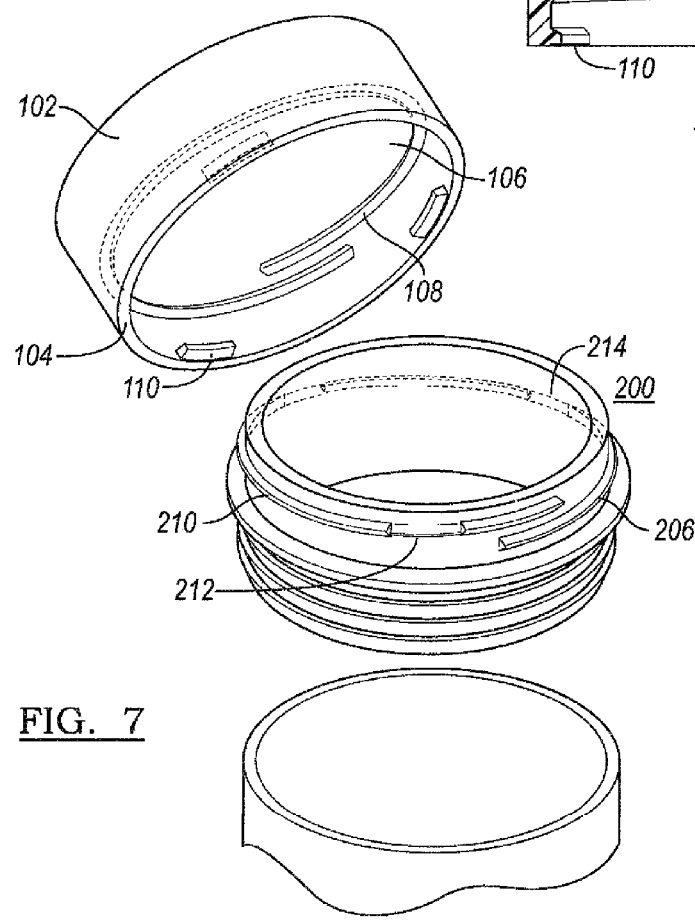
FIG. 7 is top side perspective of an open configuration of a utility based enclosure, universal security implement, and a container.

Now turning to FIG. 7, a utility based enclosure 100 is shown. The utility based enclosure 100 possesses a circumferential wall 102 delimited by an end cap 104, where the end cap 104 encloses the space contained within the circumferential wall 102. The utility based enclosure 100 is used in concert with the device 10 to create, in at least one embodiment, the means by which the container is securely enclosed.

Referring again to FIG. 7, the circumferential wall 102 possesses on its interior volume at least a single mechanism of secure closure 106. Referring to the embodiment depicted in FIG. 6, the mechanism of secure closure shown 106 is a first thread 108, where the first thread 108 serves as complementary mate to a second thread 206 of the security mechanism interface 200.

Turning to FIG. 7 again, the utility based enclosure 100 has at least one prong 110, where the utility based enclosure 100 possesses a corresponding number of prongs 110 to notches 212 of the second thread 206 of the security mechanism interface 200. In the interaction of the prongs 110 and notches 212, the device's 10 user brings the prongs 110 of the utility based enclosure 100 into alignment with the notches 212 of the second thread 206. The user then urges the prongs 110 through the notches 212. The user then rotates the utility based enclosure 100 relative to the security mechanism interface 200 such that the prongs 110 and notches 212 are in misalignment. The resulting misalignment creates a secure closure of the container into which the device 10 is situated.

Figure 5:
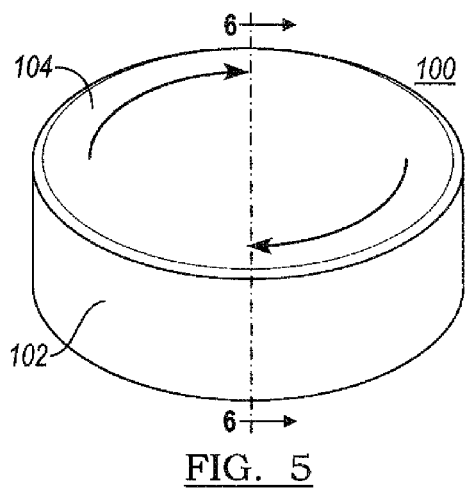
FIG. 5 is a top side perspective view of an exemplary embodiment of a utility based enclosure.

Moreover, in FIG. 5, an alternative embodiment of the device 10 depicts first thread 108 which does not possess any prongs 110 and at least a second thread 206. In this embodiment, the utility based enclosure 100 possesses at least a single thread 110 that successfully mates with a corresponding number of threads 206 on the security mechanism interface 200.

Figure 11:
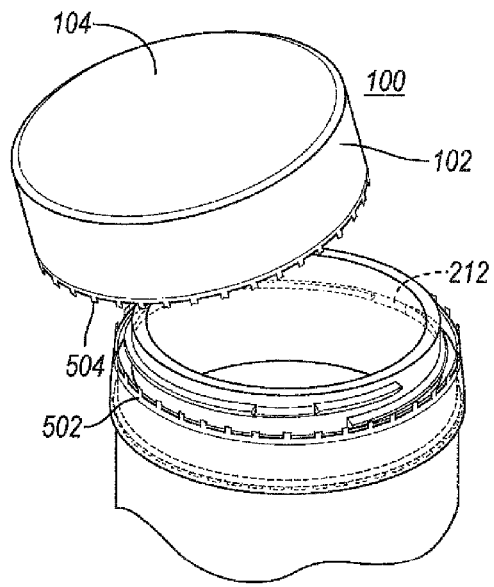
FIG. 11 is a top side perspective of an alternative embodiment of an open configuration in which a utility based enclosure containing a tamper resistant band, a universal security implement, and a container.
Figure 12:
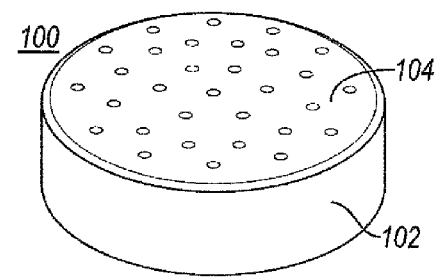
FIG. 12 is a top perspective of yet another alternative embodiment of an open configuration in which a utility based enclosure contains perforations.
Figure 13:
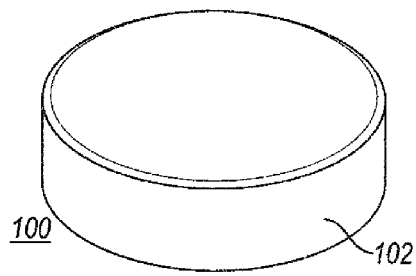
FIG. 13 is a top perspective of yet another alternative embodiment of an open configuration in which a universal security implement contains a cover with perforations, a utility based enclosure, and a container.
Figure 13:
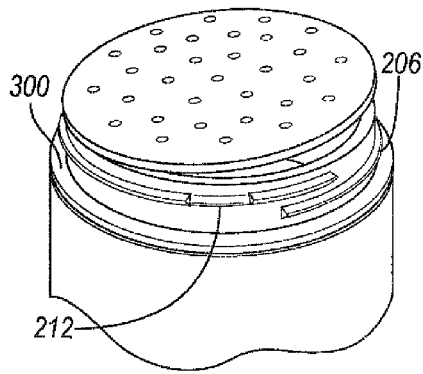

Furthermore, FIGS. 12-14c all depict at least one alternative embodiment of the device 10 in which the utility based enclosure 100 possesses depicts utility other than solely securely enclosing the container. FIG. 11 shows the device 10 in which the utility based enclosure 100 has an end cap 104 with perforations where its utility can be used as a shaker.

Figure 8:
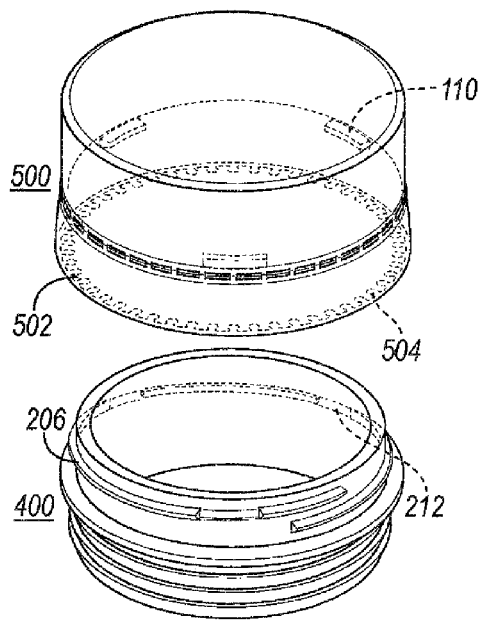
FIG. 8 is a top side perspective of an open configuration of an alternative embodiment in which a utility based enclosure contains a tamper resistant band, a universal security implement, and a container.
Figure 9:
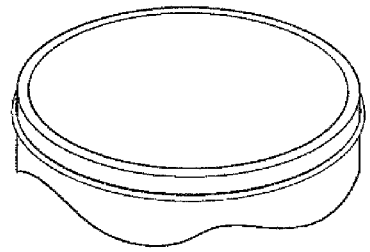
FIG. 9 is an overhead perspective of an alternative embodiment in which a utility based enclosure contains a tamper resistant band.

FIG. 8 shows yet another alternative embodiment of the device 10 in which the utility based enclosure 100 possesses a tamper resistant band 500. The tamper resistant band 500 has a circumference 502 at least equal to the circumferential wall 102 of the utility based enclosure 100. The tamper resistant band 500 has protrusions 504 that extend perpendicularly from its terminal edge that are contiguous with both the tamper resistant band 500 and the terminal edge of the utility based enclosure 100. The protrusions 504 span a minimal distance that separates the utility based enclosure 100 from the tamper resistant band 500. The protrusions 504 serve as linkages between the utility based enclosure 100 and the tamper resistant band 500. The linkages taken together form a mechanism of secure containment of the container into which the device 10 is situated. This mechanism of secure containment operates by restricting the rotational movement of the utility based enclosure 100 relative to the thread 206 of the security mechanism interface 200 and the container. By limiting the rotational movement, the utility based enclosure 100 cannot be placed into an open configuration as shown in FIG. 11. Upon sufficient force, however, the device's 10 user can overcome the structural integrity of the protrusions 504, thereby severing the linkages between the utility based enclosure 100 and the tamper resistant band 500. In doing so, the user is then able to rotate the utility based enclosure 100 to a sufficient degree relative to the security mechanism interface 200 that the device 10 and the utility based enclosure 10 can be placed into an open configuration.

Figure 4:
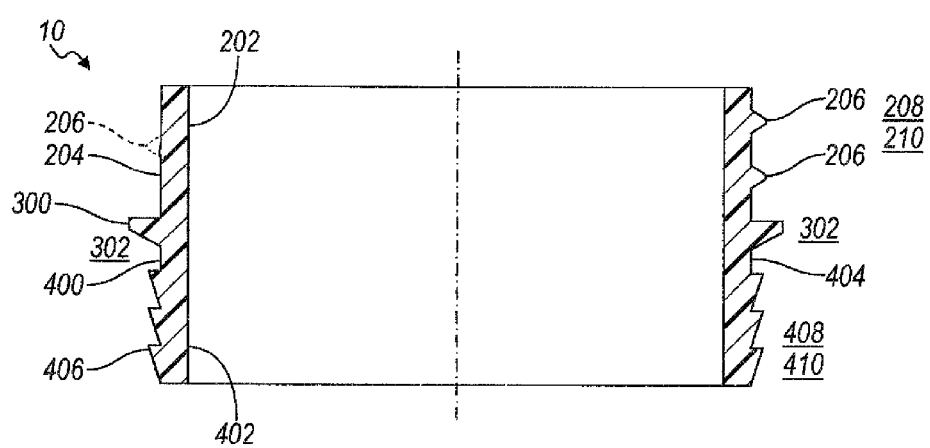
FIG. 4 is a cross-sectional view of the universal security implement.

Referring to FIGS. 2 and 4, a security mechanism interface 200 is shown in profile. The security mechanism interface 200 has an extent measured perpendicularly relative to the rim 300. The security mechanism interface 200 has an inner surface 202 that is contiguous with the totality of the interior of the universal security implement 10. The security mechanism interface 200 has an outer surface 204. The outer surface 204 of the security mechanism interface 200 has at least one thread 206. The at least one thread 206 has a volume 208, an extent 210, and at least one notch 212. The volume 208 and extent 210 of the at least one thread 206 work in concert such that they are sufficient to allow interaction with a corresponding utility based enclosure 100, such as a child resistant cap as seen in FIG. 7—the type, class, size, or manufacture of which may vary depending upon the device user's preferences—such that the interaction between the utility based enclosure 100, the at least one thread 206, and the at least one notch 212 results in secure closure of the storage container onto or into which the universal security implement 10 is situated.

Figure 3:
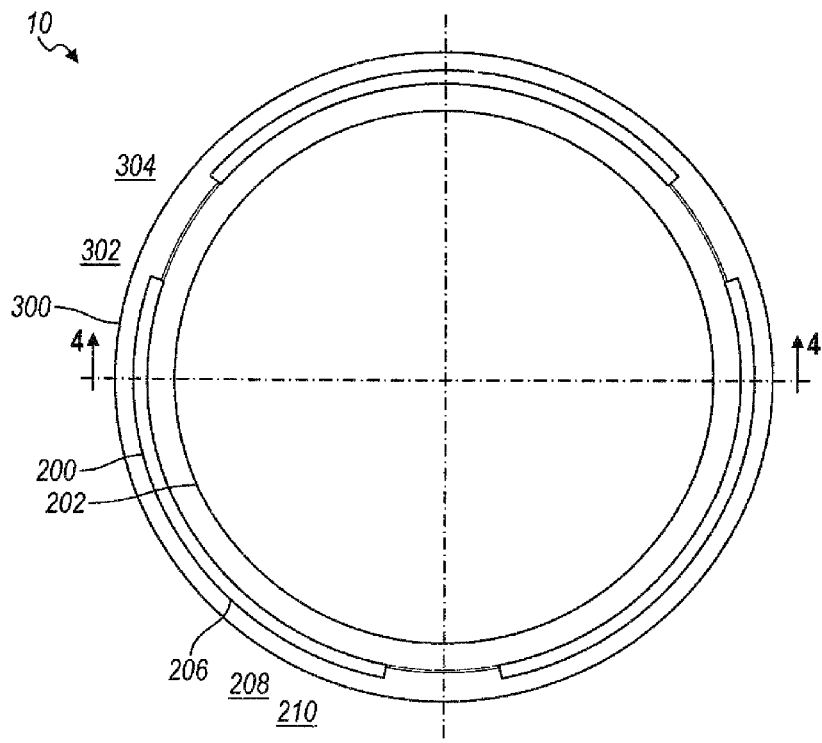
FIG. 3 is a top side profile view of the universal security implement.

Again referring to the drawings, and in particular FIGS. 2, 3, and 4, a rim 300 of the universal security implement 10 is shown. Referring in particular to FIG. 3 the rim 300 of the universal security implement 10 has a volume 302. The rim's volume 302 is sufficient to provide the universal security implement 10 both transverse and counter pressure against the terminal edge of a storage container 30 onto or into which the universal security implement 10 is situated. This transverse and counter pressure permits the device's user to limit the extent of the user's insertion of an immobilization implement 400 to its maximum perpendicular extent measured relative to the planar axis of the rim 300 as depicted in FIGS. 2 and 4, while additionally acting as a means by which the device's user may physically manipulate the device upon sufficient force relative to the storage container 30. Additionally, the rim's volume 302 permits the secure containment mechanism's terminal edge, such as that of a child-resistant cap, to abut against the upper surface of the rim 300, if so required. Moreover, the rim's volume 302 also provides the device's user a means by which to remove the universal security implement for cannabis containers 10 from the storage container 30, however situated relative to the cannabis container 30, and transfer the universal security implement 10 to another storage container 30, thus allowing the device's user to fully maximize the device's utility.

Referring particularly to FIGS. 2 and 4, the rim 300 of the universal security implement 10 has an extent 304. The rim's extent 304 is sufficient such that it can create a minimal barrier between the security mechanism 20 and the cannabis container 30 onto or into which the universal security implement 10 is situated. The rim's extent 304 creates this barrier by abutting the terminal edge of the storage container 30 to a sufficient degree such that the device's user can reach a maximum extent of insertion of the immobilization implement 400 into the storage container 30. Additionally, the rim's extent 304 complements the immobilization implement's 400 functionality by working in concert with the rim's volume 302 by providing transverse pressure such that the device's user can exercise leverage or pressure in order to properly utilize the security mechanism 30 without worry that the entire universal security implement 10 will shift, rotate, or dislodge.

Referring to FIGS. 2 and 4, the immobilization implement 400 is depicted. The immobilization implement 400 has an inner surface 402 that is contiguous with the totality of the interior of the universal security implement 10. The immobilization implement 400 has an outer surface 404. The outer surface 404 of the immobilization implement 400 has at least one rib 406. The at least one rib 406 has a volume 408. The at least one rib 406 has an extent 410. The volume 408 and the extent 410 of the at least one rib 406 work in concert such that they provide the universal security implement 10 sufficient interaction with the interior surface of the storage container 30 into or onto which it is situated, in which the resulting interaction provides the requisite level of physical friction, grip, or some other method or mode of immobilization, such that the entire device is prevented from lateral, rotational, ascending, or descending movement with respect to the storage container 30.

Figure 14A:
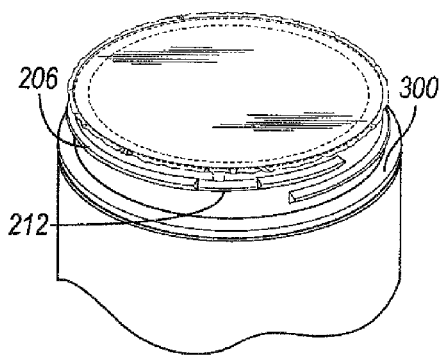
FIG. 14a is a top perspective of yet another alternative embodiment of a universal security implement which contains a cover with perforations.
Figure 14A:
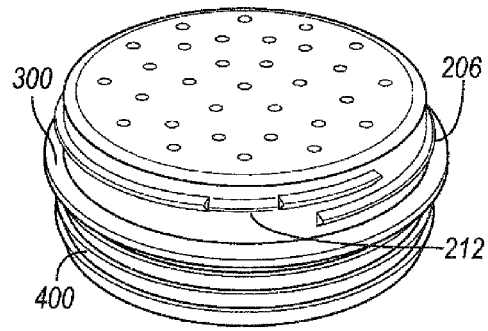
Figure 14B:
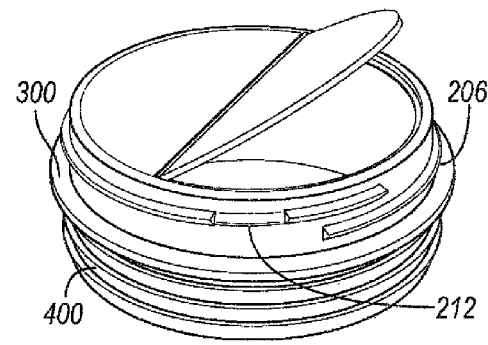
FIG. 14b is a top perspective of yet another alternative embodiment of a universal security implement which contains a cover with a hinged opening.
Figure 14C:
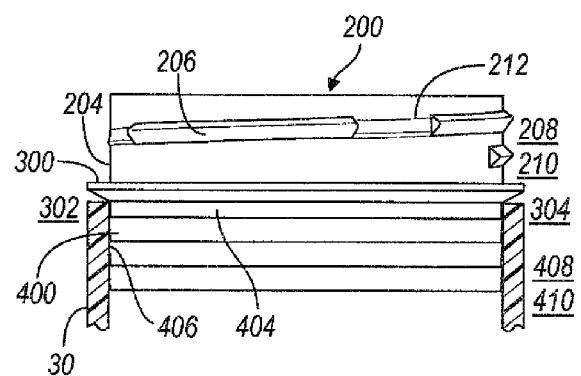
FIG. 14c is a cross-sectional view of yet another alternative embodiment in which the universal security implement possesses an immobilization implement comprised of polypropylene.

Additionally, turning to FIG. 14c, yet another alternative embodiment of the device 10 is shown in which the device 10 possess flexible ridge structures along the circumference of the immobilization element 400. This alternative embodiment possesses flexible ridge structures 406, similar to ribs 406 of the immobilization implement 400 that are sufficient to prevent rotational, ascending, or descending movement relative to the container into which the device 10 is situated. The flexible ridge structures 406 in at least this embodiment are constructed with, but are not limited to, polypropylene. The use of polypropylene allows the flexible ridge structures 406 to form and deform with respect to the interior circumferential surface of a container into which the device 10 is situated, such that the deformations fill in the empty spaces between the interior wall of a container and the immobilization element 400 of the device 10. This interaction results in a press-fit immobilization of the device 10 with respect to the container into which is it situated.

In addition to the features described herein, the universal security implement 10 may take on multiple configurations. In an unsecured configuration, the immobilization implement 400 of the device 10 can be inserted into a storage container 30 up to a maximum perpendicular extent as measured from the terminal edge of the immobilization implement 400 with respect to the rim 300 of the universal security implement 10. In this configuration, upon insertion and immobilization of the universal security implement 10, the device in conjunction with a storage container 30 is said to be unsecured because the security mechanism interface 200 has yet to interface or accept a security mechanism 20, such as a child resistant cap as shown in FIGS. 7-11, with which it will interact resulting in secure closure of the device. Thus, the device's user has complete access to the contents contained within the cannabis container 30, or alternatively, still has the ability to place contents into it.

Figure 6:
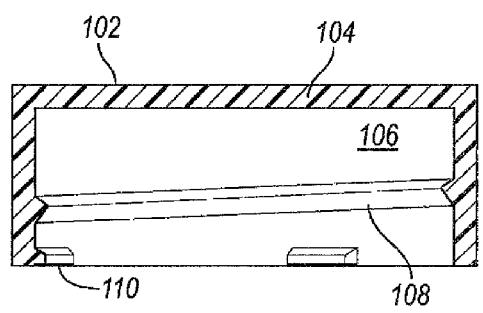
Figure 10:
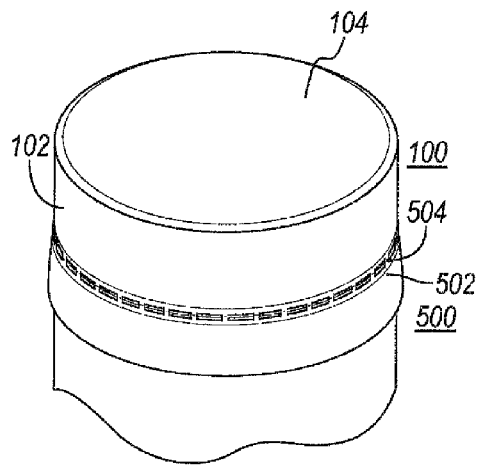
FIG. 10 is a top side perspective of an alternative embodiment of a closed configuration of a utility based enclosure containing a tamper resistant band, a universal security implement, and a container.

Furthermore, the universal security implement 10 may take on a semi-secured configuration. In a semi-secured configuration, the immobilization implement 400 is inserted into the storage container 30 into or onto which the universal security implement 10 is situated. Additionally, in this configuration, the security mechanism interface 200 has accepted a corresponding security mechanism 20 but has not yet been totally secured by the relevant mechanism of secure containment created by the interaction of the security mechanism 20 and the at least one thread 206 on the outer surface 204 of the security mechanism interface 200 of the universal security implement 10. Thus, though the contents of the storage container 30 may be covered by the security mechanism 20, they are not yet completely secure until the requisite interaction between the security mechanism 20 and the at least on thread 206 of the security mechanism interface 200 is successfully completed as shown in FIGS. 6 and 10.

Moreover, the universal security implement 10 may take on a secured configuration. In the secured configuration, the universal security implement 10 in conjunction with a storage container 30 and a corresponding security mechanism 20 contain all of the features and characteristics of a semi-secured configuration with the addition of further manipulation of the security mechanism 20 with respect to the at least one thread 206 of the security mechanism interface 200, such that the interaction between the security mechanism 20 and the at least one thread 206 of the security mechanism interface 200 results in secure closure of the storage container. Thus, in a secured configuration, the device's user will not be able to exert any amount of force, pressure, or leverage, exclusive of the amount to destroy the device's structural integrity, sufficient to overcome the resistance created between the interaction of the security mechanism 20 and the at least one thread 206 of the security mechanism interface 200.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A universal security implement, comprising: a security mechanism interface; the security mechanism interface having at least one thread, the at least one thread having a first volume, and the at least one thread having a first extent; a rim; and an immobilization implement; the immobilization implement having at least one rib, the at least one rib having a second volume, and the at least one rib having a second extent, the second extent and second volume being different than the first extent and first volume, respectively; wherein, in order to bring a container into a fully secured state, the immobilization implement of the universal security implement is situated onto or into the open end of a container, such that abutment between the at least one rib of the immobilization implement and the container precludes movement of the universal security implement relative to the container; and wherein the at least one thread having at least one notch, and the at least one notch having a third extent; and a threaded child-resistant cap mechanism of secure closure contains within its interior surface a corresponding number of prongs to the notches of the at least one thread, where the at least one prong is urged over and through the at least one notch and rotationally manipulated such that the at least one notch and the at least one prong are in misalignment, thereby resulting in an inability to access the interior volume of a container.

2. The universal security implement of claim 1, wherein the universal security implement contains at least one manner of manipulation sufficient to allow manipulation of the spatial orientation of the universal security implement relative to a container.

3. The universal security implement of claim 1, wherein the rim has a radially-outwardly directed expanse.

4. The universal security implement of claim 1, wherein the rim has a volume sufficient to delimit to a maximum degree the insertion of the universal security implement in a container such that the terminal edge of the container is prevented from being urged past the rim.

5. The universal security implement of claim 1, wherein the immobilization implement contains at least one manner of immobilization which facilitates a press-fit restriction on the inner wall of a container such that the rotational, lateral, ascending, and descending movement of the universal security implement is prevented upon insertion into the container.

6. The universal security implement of claim 1, wherein the at least one rib of the immobilization implement has a volume sufficient to facilitate a complete immobilization of the universal security implement upon insertion into a container.

7. The universal security implement of claim 1, wherein the at least one rib of the immobilization implement has an extent sufficient to facilitate a complete immobilization of the universal security implement upon insertion into a container.

8. The universal security implement of claim 1, wherein the at least one rib of the immobilization implement has a volume sufficient to disallow disengagement with a container absent the requisite force or leverage needed to overcome the immobilization of the universal security implement within the container.

9. The universal security implement of claim 1, wherein the at least one rib of the immobilization implement has an extent sufficient to disallow disengagement with a container absent the requisite force or leverage needed to overcome the immobilization of the universal security implement within the container.

10. A universal security implement, comprising: a security mechanism interface; the security mechanism interface having at least one thread, the at least one thread having a first volume, and the at least one thread having a first extent; a rim; and an immobilization implement; the immobilization implement having at least one rib, the at least one rib having a second volume, and the at least one rib having a second extent, the second extent and second volume being different than the first extent and first volume, respectively; wherein, in order to bring a container into a fully secured state, a mechanism of secure closure utilized by a security mechanism interacts with the at least one thread of the security implement interface, the interaction resulting in an inability to access the interior volume of the container onto or into which the universal security implement is situated; and wherein the at least one thread having at least one notch, and the at least one notch having a third extent; and a threaded child-resistant cap mechanism of secure closure contains within its interior surface a corresponding number of prongs to the notches of the at least one thread, where the at least one prong is urged over and through the at least one notch and rotationally manipulated such that the at least one notch and the at least one prong are in misalignment, thereby resulting in an inability to access the interior volume of a container.

11. The universal security implement of claim 10, wherein the at least one thread of the security mechanism interface has a thread angle such that a security mechanism can be urged over the at least one thread in a manner sufficient to bring the container to a fully secured state.

12. The universal security implement of claim 10, wherein the at least one thread of the security mechanism interface has a thread angle sufficient to disallow disengagement of a security mechanism absent the requisite spatial manipulation and application of force or leverage of the security mechanism.

13. The universal security implement of claim 10, wherein the at least one thread of the security mechanism interface has a volume sufficient to allow spatial manipulation of the security mechanism such that the manipulation results in a fully secured state of a container.

14. The universal security implement of claim 10, wherein the at least one thread of the security mechanism interface has a volume sufficient to disallow disengagement of a security mechanism absent the requisite spatial manipulation and application of force or leverage of the security mechanism.

15. The universal security implement of claim 10, wherein the at least one thread of the security mechanism interface has an extent sufficient to allow spatial manipulation of the security mechanism such that the manipulation results in a fully secured state of a container.

16. The universal security implement of claim 10, wherein the at least one thread of the security mechanism interface has an extent sufficient to disallow disengagement of a security mechanism absent the requisite spatial manipulation and application of force or leverage of the security mechanism.

17. A universal security implement, comprising: a security mechanism interface; the security mechanism interface having at least one thread, the at least one thread having a first volume, and the at least one thread having a first extent; a rim; and an immobilization implement; the immobilization implement having at least one rib, the at least one rib having a second volume, and the at least one rib having a second extent, the second extent and second volume being different than the first extent and first volume, respectively: wherein, in order to transfer the universal security implement from a first container to a second container, a sufficient use of force or leverage is exerted on the universal security implement in order to overcome immobilization of the universal security implement within the first container, thereby permitting insertion of the universal security implement into the second container, such that the abutment between the at least one rib of the immobilization implement and the second container's inner wall precludes movement of the universal security implement relative to the second container, thus bringing the second container into a fully secured state; the universal security mechanism leveraging a first security mechanism or a second security mechanism while fully securing the second container, where the first security mechanism is different than the second security mechanism; and wherein the at least one thread having at least one notch, and the at least one notch having a third extent; and a threaded child-resistant cap mechanism of secure closure contains within its interior surface a corresponding number of prongs to the notches of the at least one thread, where the at least one prong is urged over and through the at least one notch and rotationally manipulated such that the at least one notch and the at least one prong are in misalignment, thereby resulting in an inability to access the interior volume of a container.

18. The universal security implement of claim 17, wherein the universal security implement possesses at least one manner of manipulation such that a requisite amount of force or leverage is used to disengage the universal security implement from a first container thereby allowing transfer to a second container, wherein the first container is different from the second container.

19. The universal security implement of claim 17, wherein the rim possesses a volume sufficient to allow spatial manipulation of the universal security implement such that a requisite amount of force or leverage can be used to disengage the universal security implement from a first container and transferred to a second container, wherein the first container is different from the second container.

* * * * *